United States Patent Office 3,144,321
Patented Aug. 11, 1964

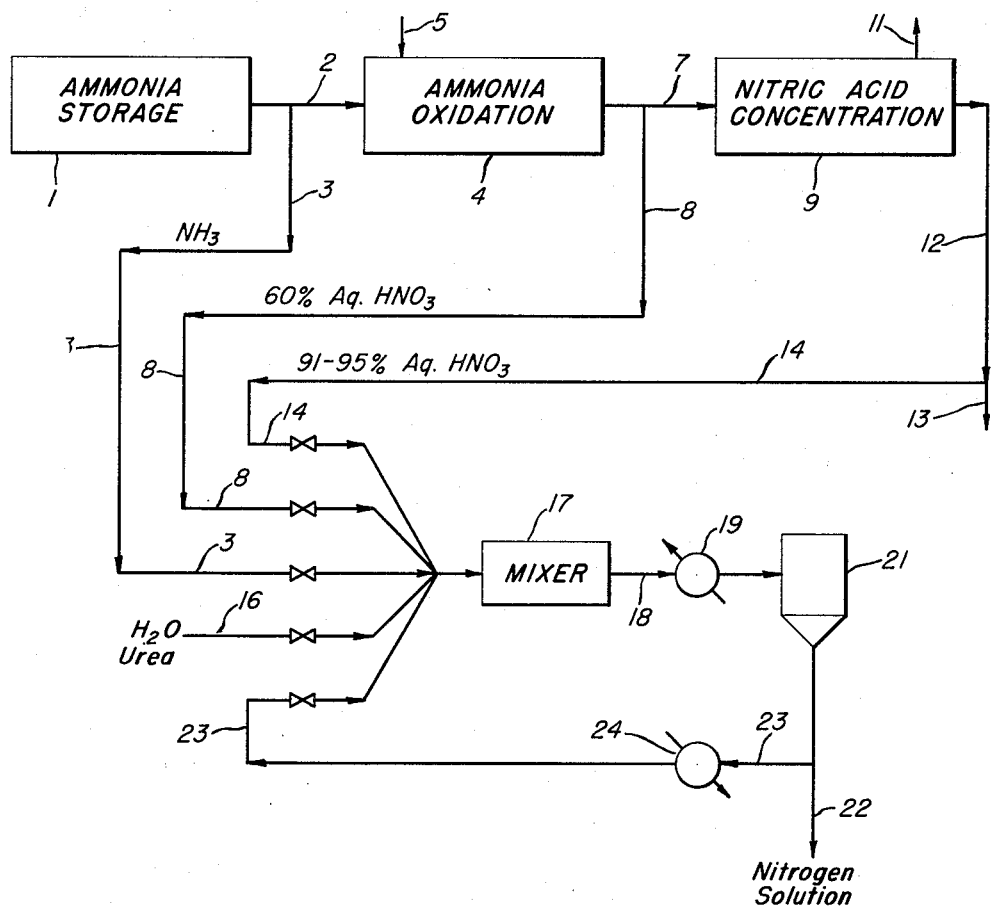

3,144,321
CONTINUOUS METHOD FOR PREPARING A NITROGEN CONTAINING FERTILIZER
Robert E. Butikofer, Highland, Ind., assignor to Standard Oil Company, Chicago, Ill., a corporation of Indiana
Filed June 6, 1962, Ser. No. 200,518
2 Claims. (Cl. 71—59)

This invention concerns the preparation of nitrogen solutions. More particularly, it provides a novel and direct method of preparing concentrated solutions of ammonia and ammonium nitrate of the type generally used in making fertilizers.

In the manufacture of nitrogenous fertilizers from ammonia, it is conventional to employ concentrated aqueous solutions of ammonia and ammonium nitrate. These solutions, generally called "nitrogen solutions," are then reacted with other ingredients such as potash or phosphates, and then usually dried or prilled for shipment and use.

Nitrogen solutions have in the past been made by what has come to be a standardized procedure. Commencing with substantially anhydrous ammonia, a portion of this is oxidized under conventional conditions to produce a nominally 60 percent aqueous nitric acid solution. This is then neutralized with another portion of the ammonia to produce ammonium nitrate in a concentrated solution of about 83 weight percent. By evaporation, this concentration is increased to about 93 percent. The resultant ammonium nitrate solution is then conventionally stored in large volume heated containers at around 285° F. prior to batch blending with ammonia and, possibly, urea and additional water.

While, as indicated earlier, the foregoing method of preparing nitrogen solutions is in common use, it has serious limitations. For one, storing 93 percent ammonium nitrate at high temperature involves the handling of a dangerous and potentially explosive material. For another, equipment and operating costs are inordinately high for this type of plant. The third problem is that it is difficult to accurately blend the various materials in order to meet product specifications.

The present invention has for its objectives the elimination of the foregoing difficulties. Briefly, according to the invention, nitrogen solutions are prepared from anhydrous ammonia by a technique which obviates the storage of ammonium nitrate at elevated temperatures. Commencing with anhydrous ammonia (99.5 percent purity, approximately), a portion of this is oxidized by conventional techniques to produce a nominal 60 percent by weight aqueous nitric acid solution. A portion of this is concentrated to 90+ weight percent nitric acid, advantageously by distillation in the presence of magnesium nitrate. Final blending of nitrogen solutions to the desired composition is accomplished by commingling an unoxidized portion of the ammonia with 60 percent aqueous nitric acid solution and with 90+ percent aqueous nitric acid solution.

Since the final blending step results in the evolution of considerable heat of reaction and of solution, a portion of the resultant nitrogen solution is cooled and cycled back to the commingling step to serve as a coolant. In addition, indirect heat exchange may be provided within the cooling step itself or subsequent thereto.

The invention in its various aspects will be described in conjunction with the attached drawing showing a schematic flow sheet of the inventive method. For reasons of clarity and simplicity, many auxiliaries, utilities, and ancillary features have been eliminated from the drawing, although those skilled in the art will readily perceive the need for, and location of, these elements.

Turning now to the drawing, substantially anhydrous ammonia is initially stored in vessel 1, where it is produced by conventional ammonia preparation methods (see "Encyclopedia of Chemical Technology," Kirk and Othmer, volume 1, page 771). For a commercial plant designed to produce 92,000 tons per pear of nitrogen solution averaging 60 weight percent ammonium nitrate, 30 percent ammonia, and 10 percent water, approximately 52,600 tons per pear of anhydrous ammonia is employed.

Ammonia from storage vessel 1 is transferred via lines 2 and 3 to downstream processing facilities. A minor amount, here 11,700 tons per year, is transferred via line 2 to the ammonia oxidation unit 4, where ammonia is catalytically oxidized with air supplied via line 5 to produce a nominally 60 weight percent aqueous nitric acid solution. This composition may vary plus or minus 3–5 percent or so, but for convenience is referred to as the 60 percent aqueous nitric acid. Techniques of ammonia oxidation are known, and are described, for example, in Kirk and Othmer, above, volume 9, page 330, et seq.

The 60 percent aqueous nitric acid solution from ammonia oxidation facilities 4 is divided into two portions; the major portion being passed via line 7 to nitric acid concentration facilities 9 while the minor proportion is transfered via line 8 to the blending facilities to be described subsequently. In this example, 26,000 tons per year of 60 percent nitric acid is passed via line 7 to the concentration facilities 9, while 15,200 tons per year is fed through line 8.

Concentration of 60 percent nitric acid solution to 90+ percent nitric acid by distillation alone is not possible due to a maximum boiling azeotrope at about 68 percent nitric acid. Methods are known however by which a water binding agent such as sulfuric acid or, preferably, magnesium nitrate solution, may be utilized to obtain nitric acid concentrations beyond 68 percent (Kirk and Othmer, above, Second Supplemental Volume, page 487, et seq.)

Although for clarity and simplicity the details of a nitric acid concentration system have been eliminated from the drawing, the process is quite simple. Concentration is effected in a dehydrating tower, the lower portion of which is designated as a stripping zone and the upper portion a rectification zone. Sixty percent nitric acid solution is fed to the upper portion of the stripping zone, while a 72 weight percent aqueous solution of magnesium nitrate, at about 280° F., is introduced to the stripping zone at or above the point of introduction of the 60 percent nitric acid. Vapors containing about 87 percent nitric acid pass from the top of the stripping section to the bottom of the rectification zone. The overhead product from the rectification zone is passed through a condenser and a portion recovered at 99.5 percent nitric acid. The balance of the condensed acid is refluxed to the rectifying zone. The bottoms product from the rectifying zone contains approximately 75 percent nitric acid and enters the top of the stripping zone.

The bottoms product from the stripping zone contains about 68 percent magnesium nitrate and usually less than about 0.1 percent free nitric acid. A portion of this bottoms product is used as the reboiler feed to the stripping zone, while the remainder passes to a vacuum evaporator in which the magnesium nitrate concentration is raised to 72 percent for recycle to the dehydrating tower.

In the operation shown in the drawing, the nitric acid concentration facilities 9 produce about 26,000 tons per year of about 95 percent aqueous nitric acid, rather than the 99.5 percent acid described above. In actuality, nitric acid purity can be varied within the 90–99.5 percent range quite easily, but for the present purposes it is generally unnecessary to concentrate beyond 91–95 percent Further, in the event it is desired to market such concentrated nitric acid, excess production over and above that necessary for nitrogen solution production may be obtained at line 13.

The major production of nitric acid facilities 9 passes via line 12 and 14 to the mixing or commingling facilities now to be described.

A major feature of the invention is the ability to produce nitrogen solutions of widely varying composition. Ordinarily a nitrogen solution will contain from about 8 to about 49 weight percent free ammonia (more generally about 8–34 percent), from about 36 to about 72 weight percent ammonium nitrate (more commonly about 60–72 percent), and about 5 to about 20 percent water (usually 6–12 percent). On occasion it is desirable to dilute this further, or to add about 6–7 percent urea, and this may be accomplished via line 16. In the present example however, valved line 16 is closed off, and no additional water or urea is utilized.

In the present example, a nitrogen solution of 30 weight percent ammonia, 60 weight percent ammonium nitrate, and 10 percent water is to be produced at a rate of 92,000 tons per year. For this, 26,000 tons per year of 95 percent aqueous nitric acid is conducted to mixer 17 via valved line 14; 15,200 tons per year of 60 percent nitric acid is admitted via valved line 8; and 41,400 tons per year anhydrous ammonia is admitted via line 3.

Mixer 17 may be any of the solution blenders of widely varying types generally known to the art, e.g., agitator-equipped tanks, pump-type agitators, or the like. These enable the various components of the final nitrogen solution to be intimately mixed together, and enable the nitric acid to be neutralized with anhydrous ammonia.

The reaction and solution occurring in mixer 17 is highly exothermic, and provision is made according to the invention for removing heat of reaction in one or two ways. First, it is quite convenient to provide a cooler, shown symbolically by cooler 19 in line 18, either downstream of mixer 17 or integral with the mixer itself, as in the case of various mixers which are provided with heat exchange tubes therein. However a major portion of the cooling is accomplished by a recycle stream of cooled nitrogen solution, obtained via line 23 and admitted to mixer 17 along with the other components of the solution. This recycle stream, advantageously in a volume ratio of about 0.5 to about 20, e.g., 5, volumes per volume of total fluid added via lines 3, 8, 14, and 16, is desirably cooled to below about 100° F. prior to introduction, and the comparatively large volume of this stream relative to that of the reactants serves to mitigate the temperature rise produced by reaction and solution.

The nitrogen solution from mixer 17 passes via line 18 and symbolic cooler 19 to surge tank 21. The temperature here is desirably below about 150° F., suitably about 90–140° F., so as to maintain a low vapor pressure of the solution; commercial nitrogen solutions have vapor pressures at 120° F. ranging from about 18 to about 72 p.s.i.g., and accordingly this is the minimum necessary pressure obtaining in surge tank 21.

The final nitrogen solution product is withdrawn from the bottom of surge tank 21 and transferred via line 22 to storage and/or shipping, advantageously after subsequent cooling in a cooler not shown. For the plant described above, this nitrogen solution is recovered in a quantity of about 92,000 tons per year, and averages 30 percent ammonia, 60 percent ammonium nitrate, and 10 percent water.

A unique advantage of the invention is that final blending may be continuous in keeping with the generally continuous nature of the entire process. Thus, each of the feed streams to mixer 17 may be maintained at a relatively constant rate in order to produce a desired composition of nitrogen solution. Should marketing requirements dictate a changed or altered solution composition, one or more of the stream flow rates may be altered accordingly. This may be accomplished quite readily by providing control valves on each of lines 3, 8, 14, 16, and 23, regulating the valves either manually, automatically on flow control, or automatically with a proportional blending system of which many are known to the art. Thus the inventive system is exceedingly versatile.

It is evident from the above description that there has been provided according to the invention an outstanding process for preparing nitrogen solutions. By oxidizing a portion of the ammonia to produce 60 percent aqueous nitric acid solution, concentrating a portion of this to 90+ percent nitric acid concentration, and commingling ammonia, 60 percent solution, and 90+ percent solution in the desired proportion, nitrogen solutions of virtually any composition may be prepared. Further, by recycling a cooled fraction of the produced nitrogen solution to the commingly step, heat effects resulting from reaction and solution are substantially reduced. Moreover, equipment requirements are considerably lower than those of prior art nitrogen solution manufacturing plants, and there is no need to provide for expensive and hazardous storage of ammonium nitrate.

All quantities of nitric acid herein are expressed on 100% $HNO_3$ basis. Ammonium nitrate is also on a 100% basis.

While the invention has been described above in connection with a specific embodiment thereof, it will be manifest that many alternatives, modifications, and variations will be evident to those skilled in the art in light of the foregoing description. Accordingly, it is intended to embrace all such alternatives, modifications, and variations that fall within the spirit and broad scope of the appended claims.

I claim:

1. A continuous method of preparing nitrogen solutions containing ammonia, ammonium nitrate and water from anhydrous ammonia which comprises:
   oxidizing a portion of said ammonia to produce a nominal 60 percent aqueous nitric acid solution,
   concentrating a first portion of said 60 percent aqueous nitric acid solution to 90+ percent aqueous nitric acid solution,
   commingling an unoxidized portion of said ammonia with 60 percent aqueous nitric acid solution and with 90+ percent aqueous nitric acid solution in sufficient proportion to form a nitrogen solution of desired composition,
   and cooling a portion of said nitrogen solution and cycling said cooled portion to the previous commingling step to serve as a coolant therefor.

2. A continuous method of preparing nitrogen solutions containing 8–49 weight percent ammonia, 36–72 weight percent ammonium nitrate, and 5–20 percent water from anhydrous ammonia, wherein a portion of said ammonia is oxidized to produce a nominal 60 percent aqueous nitric acid solution, the improvement whereby storage of ammonium nitrate at elevated temperatures is avoided which comprises:

concentrating a first portion of said 60 percent aqueous nitric acid solution to 90+ percent aqueous nitric acid solution, commingling an unoxidized portion of said ammonia with 60 percent aqueous nitric acid solution and with 90+ percent aqueous nitric acid solution in sufficient proportion to form a nitrogen solution within the aforementioned composition range, cooling a portion of said nitrogen solution, and cycling said cooled portion to the previous commingling step to serve as a coolant therefor.

References Cited in the file of this patent

UNITED STATES PATENTS

| | | |
|---|---|---|
| 2,023,199 | Harvey | Dec. 3, 1935 |
| 2,077,469 | Fazel | Apr. 20, 1937 |
| 2,770,538 | Vierling | Nov. 13, 1956 |